July 25, 1967
A. I. SWARTZ
3,332,670
BLENDING DEVICE
Filed Dec. 15, 1964
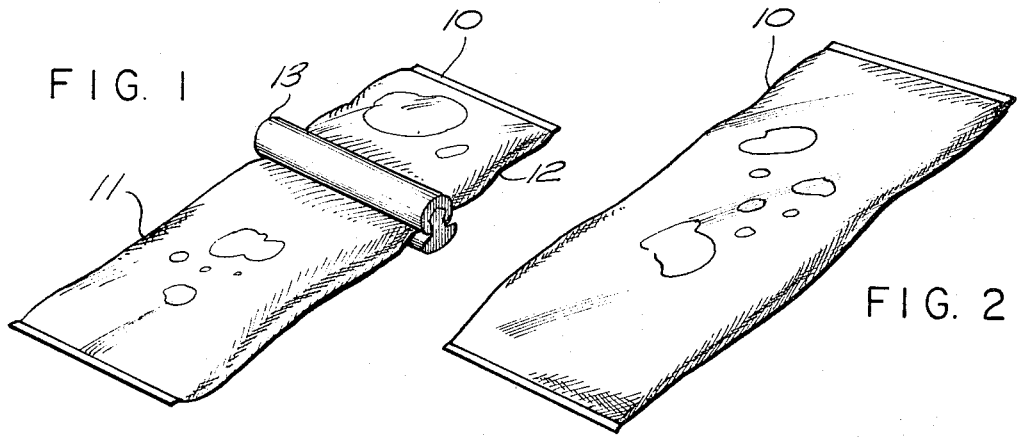
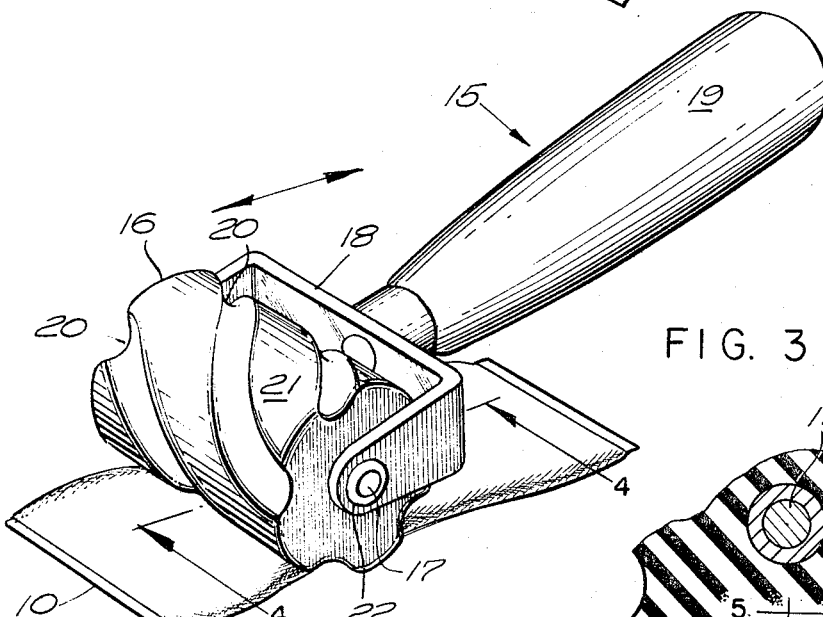
INVENTOR.
ALLEN I. SWARTZ
BY
Weingarten, Orenbuch & Lahive
ATTORNEYS

United States Patent Office 3,332,670
Patented July 25, 1967

3,332,670
BLENDING DEVICE
Allen I. Swartz, Malden, Mass., assignor to Tra-Can, Inc., Medford, Mass., a corporation of Massachusetts
Filed Dec. 15, 1964, Ser. No. 418,394
2 Claims. (Cl. 259—144)

This invention relates generally to blending devices and more particularly to a blender utilized to mix different materials within a single closed container or package.

Many manufacturing techniques today require the use of chemicals in certain proportions but which must be separately maintained before use in order to prevent premature reaction. To meet this requirement, the packaging industry has developed pliant, single containers which can be compartmentized to separately maintain a plurality of chemicals, in the proper proportions, until mixing is called for.

Having such ingredients in separate compartments of a single package is desirable since it facilitates selling them as a unit while at the same time keeping them separated as to avoid premature reaction of the chemicals and further assures that the material will be mixed in the proper proportions. This package is further capable of serving as a mixing container without the materials contained in the compartments being exposed to the air, thus assuring that the chemicals do not become contaminated and still further assures that the user does not get any of the chemicals on his hands since such chemicals may be deleterious to the skin or difficult to remove.

In general, many of these packages are filled with chemicals which, when mixed, will set into a mass of hard, durable, heat resistant plastic. Such materials may be, for example, a fluid resin such as an epoxy and a hardener. Packages so filled are used in large quantities especially in the production of electrical and electronic devices. Since the material must be used within a short period after mixing, the packages are of relatively small size. For example, one typical and commonly used package has a width of 1½" and a length of 3½".

These packages must be kneaded to assure adequate mixing of the chemicals once the divider assembly separating them has been removed. Heretofore, such kneading has been done by hand. Because of the small package size and the viscosity of the chemicals, such hand kneading required extensive use of the fingers and, when during the day a large number of packages were used, such hand kneading became quite arduous. Further, since many of the production workers on such components are female, their fingers do not have sufficient strength to constantly knead many packages over a prolonged period. Thus, they fail to obtain complete and proper mixing of the chemicals. It has been found that especially toward the end of the work shift, the workers, being tired, fail to knead the package properly for a sufficient length of time. When chemicals such as epoxy and hardeners are not mixed in the proper proportions, the epoxy does not cure adequately. Inadequately cured epoxies when used on electrical or electronic components results in a high scrap rate of the final product leading to a significant reduction of profits.

Still other packages may be inadequately sealed and when being kneaded by hand may leak and since such epoxy resins and hardeners are strong sensitizing agents, the worker must avoid getting the materials in the eyes and must avoid prolonged or repeated contact with the skin.

The present invention is a machine arranged to reduce the labor of the worker kneading such packages and, by so reducing the worker's labor, prevent poor work habits and insure adequate mixing of the materials to result in fewer inadequately cured components, thus leading to a lower scrap rate and higher profits.

The machine also greatly reduces exposure of the worker's hands to any chemicals that may be leaking from faulty packages, thus reducing possible injuries to the worker.

The present invention achieves these and other advantages by using a uniquely designed roller to knead the package in a manner which thoroughly and completely mixes the chemicals with very little effort required by the worker.

Additional features of the present invention and the advantages thereon will become readily apparent from a study of the following specification in conjunction with the accompanying drawings in which:

FIG. 1 is a perspective view of a multi-compartment package embodying a clamp separating the compartments;

FIG. 2 is a perspective view of the package when the clamp has been removed;

FIG. 3 is a view of the roller of the present invention when utilized as a hand tool in conjunction with the package shown in FIG. 2;

FIG. 4 is a sectional view of the device shown in FIG. 3 taken along the lines 4—4; and FIG. 5 is a sectional view of the device shown in FIG. 4 taken along the lines 5—5.

Referring now to FIG. 1, there is illustrated a substantially flat compartmented package 10 which is of any suitable shape and formed of a flexible material. Such a package may be, for example, a length of extruded light-weight flexible plastic tubing sealed on either end and having two compartments 11 and 12 separated by a divider assembly 13. A chemical such as an epoxy may be, for example, in compartment 11 and compartment 12 may contain, for example, a suitable hardener for the epoxy contained in compartment 11. The plastic package, the divider assembly and the manner of filling described in FIG. 1 is more fully described and illustrated in U.S. Patent No. 3,082,867.

FIG. 2 represents the package 10 of FIG. 1 having the divider assembly 13 removed so that the compartments 11 and 12 are unified. Normally, such a package, after removal of the divider assembly 13, is immediately kneaded by hand in order to assure that the hardener is thoroughly mixed throughout the epoxy. Such hand kneading is difficult, time consuming and arduous since it requires considerable use of the fingers and when such packages are used on production lines, large numbers are required. It has been found that hand kneading of such packages, especially when a large number is used during a work shift, does not completely mix the two materials, thus resulting in improperly cured epoxies.

FIG. 3 illustrates the present invention being used on the unified package 10 shown in FIG. 2. As illustrated, the invention is embodied in a hand tool 15 which comprises a roller body 16 having an axle assembly 17 supported by suitable bearings 22 maintained in a U-shaped bracket 18. The axle 17 in conjunction with the bearings 22 rotatably supports the roller 16 in the bracket 18. Fixedly attached to bracket 18 is a suitable handle 19 which can be used to apply a force to roller 16 causing it to pass over the package 18 in either direction.

Roller 16 has a plurality of helical grooves 20 on its surface 21 which pass longitudinally down and across the surface 21 and are separated by lands 34 giving roller 16 an appearance similar to a helical or worm gear.

The manner in which the roller 16 operates to force the chemicals contained within the package 10 to mix, is more appropriately described in conjunction with FIGS. 4 and 5 which are sectional views of the roller 16.

If we assume that the roller 16 is moving to the right as shown in FIG. 3, then the package 10 is compressed such that the upper surface 30 either meets the lower surface 31 or, as shown in FIG. 4, has a very thin layer 32 of the chemical between the surfaces 30 to 31. In the groove 20a which rests on surface 30, the chemical 32 is forced upward so that the surface 30 is deformed to substantially conform to the shape of the groove 20a. The leading edge 33 of groove 20 in conjunction with the land 34 lying between grooves 20a and 20b causes the chemical 32 to be pushed ahead in the direction of the roller 16. This pushing ahead of the chemical is similar to that of snow being pushed by a plow.

Since the package 10 is of relatively short length, this ploughing action increases the pressure on the chemical 32 which is in front of the roller 16. This increased pressure causes the chemical to be forced through and out of the groove 20a opposite to the direction of the roller 16. This forcing of the chemical 32 out of the groove 20a, causes a turbulence in the chemical 32 in back of the roller 16 which agitates and thoroughly mixes the chemical as the roller 16 is respectively passed back and forth over the package 10.

For mixing viscous chemicals such as resins in small packages of the size previously described, the present invention was embodied in a hand tool in which the roller 16 was a wooden cylinder approximately 1⅞ inches wide and 1⅜ inches in diameter having an axially bored hole passing therethrough. On the surface 21 of roller 16, there was formed five helical grooves 20 of hemispherical cross-section approximately ¼ inch wide and ⅛ inch deep. Each groove 20 was separated from its adjacent grooves by lands approximately ⅜ inch wide. The axle 17 was a cylindrical steel shaft about 2½ inches long and about ⅜ inch in diameter. Bracket 18 was of metal about 2 inches wide having the legs of the U- about 1¼ inches long while handle 19 was of wood and about 4 inches long.

It should be noted that although a package containing only two materials was used in the illustration, that package containing a multiplicity of materials could also be used. Further, despite the illustration of the invention as a hand tool with but five grooves on the surface of roller 16, it could conceivably be introduced into a piece of automatic equipment such as a roller mill and contain a greater or lesser number of grooves, depending upon the material being kneaded. Additionally, although the invention has been described as kneading liquid materials contained in a package, the invention is not restricted to kneading liquids, but may be utilized to knead any putty-like or powdered material in the described manner.

It is further obvious that still other changes can be made. For example, handle 19, although shown in FIG. 3 as perpendicular to bracket 18 can be of any suitable configuration such as a pistol grip. Still further it is obvious that all the component parts of the tool may be composed of any suitable easily formed material, such as plastic, and that the surfaces of the tool may be painted or dyed.

Accordingly, since changes may be made in the illustrated construction without departing from the spirit of the invention, it is understood that the foregoing detailed description of this specific embodiment has been given primarily to facilitate understanding and should be interpreted as illustrative only and not in a limiting sense, since various improvements may become obvious to persons skilled in the art. It is, therefore, desired that the foregoing invention be limited only by the following claims.

What is claimed is:

1. A device for the mixing together of a multiplicity of viscous materials contained in a single sealed package comprising means for creating a turbulence in the package to mix the materials contained therein, said means comprising a cylindrical body member rotatably mounted in a support member, said cylindrical body member having a plurality of helical grooves of semi-circular cross-section passing at an angle of approximately 45° across the surface of said cylindrical body and a plurality of lands separating said grooves and a means for propelling said cylindrical body across said package to force the material contained in said package through said grooves and opposite to the direction of the roller to create a turbulence in said material, thereby mixing said materials.

2. A device for the mixing together of a multiplicity of liquid materials contained in a single, sealed, flexible package comprising means for creating a turbulence in said package to agitate and mix the materials contained therein, said means comprising a cylindrical roller rotatably mounted and supported in a U-shaped bracket by an axle assembly and a plurality of bearings, said roller having an axially bored hole passing therethrough, said axle inserted in said hole and in said bearing to rotatably support said roller in said U-shaped support, said roller further having a plurality of helical grooves of semi-circular cross-section formed in the surface of said roller and separated from each other by a plurality of lands, and means for applying a propelling force to said roller across said flexible package to force the liquids contained in said package through said groove opposite to the direction of said propelling force to create a turbulence in said liquids to mix said liquids, said propelling means comprising a handle fixedly attached to said U-shaped bracket.

References Cited

UNITED STATES PATENTS

| 2,406,403 | 8/1946 | Rogers | 259—72 X |
| 2,420,494 | 5/1947 | Owens | 259—126 |
| 2,539,457 | 1/1951 | Metheny et al. | 359—72 |
| 2,552,889 | 5/1951 | Eaton | 29—121 |

FOREIGN PATENTS

| 920,735 | 1/1947 | France. |
| 1,135,454 | 12/1956 | France. |
| 183,944 | 8/1922 | Great Britain. |

WILLIAM I. PRICE, *Primary Examiner.*